United States Patent
Zhang

(10) Patent No.: US 11,941,094 B2
(45) Date of Patent: Mar. 26, 2024

(54) SCREEN UNLOCKING METHOD AND APPARATUS, AND COMPUTER DEVICE AND STORAGE MEDIUM

(71) Applicants: Beijing Jingdong Shangke Information Technology Co., Ltd., Beijing (CN); Beijing Jingdong Century Trading Co., Ltd., Beijing (CN)

(72) Inventor: Wei Zhang, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 266 days.

(21) Appl. No.: 17/423,709

(22) PCT Filed: Jan. 2, 2020

(86) PCT No.: PCT/CN2020/070086
§ 371 (c)(1),
(2) Date: Jul. 16, 2021

(87) PCT Pub. No.: WO2020/147590
PCT Pub. Date: Jul. 23, 2020

(65) Prior Publication Data
US 2022/0114242 A1  Apr. 14, 2022

(30) Foreign Application Priority Data
Jan. 18, 2019  (CN) .......................... 201910048563.0

(51) Int. Cl.
*G06F 21/31* (2013.01)
*G06F 21/46* (2013.01)

(52) U.S. Cl.
CPC ............ *G06F 21/316* (2013.01); *G06F 21/46* (2013.01)

(58) Field of Classification Search
CPC ...... G06F 21/46; G06F 21/1084; G06F 21/32; G06F 21/36; G06F 21/316
See application file for complete search history.

(56) References Cited

U.S. PATENT DOCUMENTS 6,590,597 B1 * 7/2003 Kim ....................... G09G 1/005
715/764
10,691,786 B1 * 6/2020 Park ....................... G06F 3/0488
(Continued)

FOREIGN PATENT DOCUMENTS

| CN | 102098386 A | 6/2011 |
| CN | 104462892 A | 3/2015 |

(Continued)

OTHER PUBLICATIONS

International Search Report for PCT/CN2020/070086, dated Apr. 1, 2020, 2 pages.

*Primary Examiner* — Dao Q Ho
(74) *Attorney, Agent, or Firm* — Blank Rome LLP

(57) ABSTRACT

A screen unlocking method and apparatus, and a computer device and a storage medium. The method comprises: obtaining interactive information generated when a user performs a predetermined operation; dynamically updating the generated interactive information to a pre-built interactive information database; upon receiving a screen unlocking request, invoking first interactive information in the database according to a first predetermined mode; generating an unlock tag according to said first interactive information; generating, according to the unlock tag, multiple interference tags that are different from the unlock tag; and sending the unlock tag and the multiple interference tags to (Continued)

a terminal device for display, receiving a user's operation for triggering the unlock tag, and unlocking a screen.

9 Claims, 5 Drawing Sheets

(56) References Cited

U.S. PATENT DOCUMENTS

| | | | | |
|---|---|---|---|---|
| 2014/0013424 | A1* | 1/2014 | Lv | G06F 21/32 |
| | | | | 726/19 |
| 2014/0137049 | A1* | 5/2014 | Jung | G06F 21/36 |
| | | | | 715/847 |
| 2014/0195352 | A1* | 7/2014 | Govan | G06Q 30/0262 |
| | | | | 705/14.59 |
| 2014/0298260 | A1* | 10/2014 | Abowd | G06F 3/04842 |
| | | | | 715/810 |
| 2022/0114242 | A1* | 4/2022 | Zhang | G06F 21/316 |

FOREIGN PATENT DOCUMENTS

| | | |
|---|---|---|
| CN | 105825154 A | 8/2016 |
| CN | 106326718 A | 1/2017 |

\* cited by examiner

SCREEN UNLOCKING METHOD AND APPARATUS, AND COMPUTER DEVICE AND STORAGE MEDIUM

This application is a national stage of International Application No. PCT/CN2020/070086, filed on Jan. 2, 2020, which claims the priority of Chinese Patent Application No. 201910048563.0, titled "METHOD, APPARATUS, AND STORAGE MEDIUM FOR UNLOCKING LOCK SCREEN", filed on Jan. 18, 2019. Both of the aforementioned applications are hereby incorporated by reference in their entireties.

TECHNICAL FIELD

The present disclosure relates to the field of Internet technology, and in particular, to a method, apparatus, computer device and storage medium for unlocking a lock screen.

BACKGROUND

With the popularization of intelligent terminals and various applications, lock screen technologies have become the technologies widely used by people. Current lock screen unlocking methods include gesture unlocking, password unlocking, picture unlocking and the like. However, in either of the above unlocking methods, a preset value (also called a password, which may be a picture, a character, a number or the like) is set in advance, and then the value input by the user on the lock screen is compared with the preset value. If the value input by the user is the same as the preset value, the unlocking is realized. If the value input by the user is different from the preset value, the unlocking fails.

SUMMARY

According to some embodiments of the present disclosure, a method for unlocking a lock screen, includes:
  acquiring interactive information generated by a user performing a predetermined operation;
  dynamically updating the generated interactive information into a pre-built interactive information database;
  invoking, when receiving a lock screen unlocking request, first interactive information in the database according to a first predetermined manner;
  generating an unlocking label according to the first interactive information invoked by the first predetermined manner, where the unlocking label is a label that realizes unlocking of a lock screen after being triggered by the user;
  generating multiple interference labels that are different from the unlocking label according to the unlocking label, where the interference labels are labels that can not realize the unlocking of the lock screen after being triggered by the user;
  transmitting the unlocking label and the multiple interference labels to a terminal device for display; and
  receiving a user operation of triggering the unlocking label to unlock the lock screen.

Alternatively, the first predetermined manner is defined as invoking interactive information generated last time the user performs the predetermined operation in the database.

Alternatively, the generating the interference labels that are different from the unlocking label according to the unlocking label, includes:
  invoking second interactive information in the database according to a second predetermined manner; and
  generating the interference labels that are different from the unlocking label according to the second interactive information invoked by the second predetermined manner.

Alternatively, the generating the multiple interference labels that are different from the unlocking label according to the unlocking label, includes:
  storing recommendation information into the database; and
  generating the interference labels that are different from the unlocking label according to the recommendation information.

Alternatively, after a step of displaying the unlocking label and the interference labels, the method further includes:
  jumping, when the number of times that the user triggers the interference labels reaches a predetermined number, to another lock screen unlocking mode.

According to some embodiments of the present disclosure, an apparatus for unlocking a lock screen includes:
  an acquisition module configured to acquire interactive information generated by a user performing a predetermined operation;
  a database module configured to dynamically update the generated interactive information into a pre-built interactive information database;
  an invoking module configured to invoke, when receiving a lock screen unlocking request, first interactive information in the database according to a first predetermined manner;
  an unlocking label generation module configured to generate an unlocking label according to the first interactive information invoked by the first predetermined manner, where the unlocking label is a label that realizes unlocking of the lock screen after being triggered by the user;
  an interference label generation module configured to generate multiple interference labels that are different from the unlocking label according to the unlocking label, where the interference labels are labels that can not realize the unlocking of the lock screen after being triggered by the user;
  a display module configured to transmit the unlocking label and the multiple interference labels to a terminal device for display; and
  an unlocking module configured to receive a user operation of triggering the unlocking label to unlock the lock screen.

Alternatively, the invoking module includes:
  a definition module configured to define the first predetermined manner as invoking interactive information generated last time the user performs the predetermined operation in the database.

Alternatively, the invoking module is further configured to invoke second interactive information in the database according to a second predetermined manner; and
  the interference label generation module is further configured to generate the interference labels that are different from the unlocking label according to the second interactive information invoked by the second predetermined manner.

Alternatively, a receiving module is configured to store recommendation information into the database; and the interference label generation module is configured to generate the interference labels that are different from the unlocking label according to the recommendation information.

Alternatively, a jumping module is configured to jump, when the number of times that the user triggers the interference labels reaches a predetermined number, to another lock screen unlocking mode.

According to some embodiments of the present disclosure, a method for unlocking a lock screen includes:
generating a lock screen unlocking request according to a user operation on an application on a terminal device, and transmitting the lock screen unlocking request to a server;
receiving an unlocking label and multiple interference labels from the server, and displaying the unlocking label and the multiple interference labels on a lock screen interface;
detecting a user operation of triggering the unlocking label and notifying the server of the user operation; and
receiving an unlocking instruction from the server to unlock the lock screen.

According to some embodiments of the present disclosure, an apparatus for unlocking a lock screen includes:
a lock screen module configured to generate a lock screen unlocking request according to a user operation on an application on a terminal device, and transmit the lock screen unlocking request to a server;
a label display module configured to receive an unlocking label and multiple interference labels from the server, and display the unlocking label and the multiple interference labels on a lock screen interface;
a label trigger detection module configured to detect a user operation of triggering the unlocking label and notify the server of the user operation; and
an unlocking module configured to receive an unlocking instruction from the server to unlock the lock screen.

According to some embodiments of the present disclosure, a computer device includes a memory and a processor, and the memory stores a software program, which, when executed by the processor, implements the above steps of the method for unlocking a lock screen.

According to some embodiments of the present disclosure, a computer readable storage medium stores a computer program, and the program, when executed by a processor implements the steps of the method for unlocking a lock screen.

As can be seen from the above, based on the above embodiments, and according to the lock method for unlocking a lock screen of the present disclosure, the dynamically updated interactive information is generated every time the user performs the predetermined operation, and the dynamical interactive information is updated into the interactive information database, the interactive information in the database is invoked to generate the dynamically updated unlocking label, thereby realizing the constant dynamic update of the unlocking label.

DETAILED DESCRIPTION OF EMBODIMENTS

In order to make the purpose, technical solutions and advantages of the present disclosure clearer, the present disclosure is further described in detail below with reference to the accompanying drawing and embodiments.

The applicant finds that in the existing lock screen unlocking methods, the user needs to first preset a value, and then input the value to be compared with the preset value when unlocking a screen, and the interference item is basically not related to the preset content. Moreover, the preset value must be changed actively, to realize the purpose of changing the password regularly, and the user operability is not very effective and the security is not very high. Therefore, some embodiments of the present disclosure provide a method, apparatus, computer device and storage medium for unlocking a lock screen.

Figure 1A:
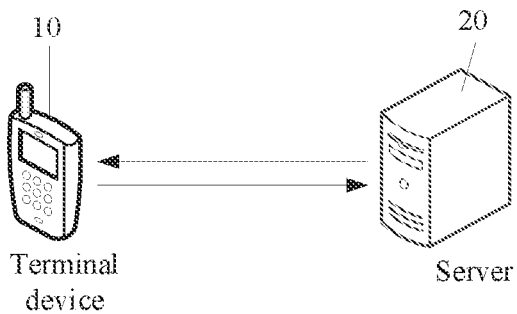
FIG. 1A is a schematic diagram of an application scenario of a method for unlocking a lock screen according to some embodiments of the present disclosure.

FIG. 1A is a schematic diagram of an application scenario of a method for unlocking a lock screen according to some embodiments of the present disclosure. Referring to 1A, the application scenario of the method for unlocking a lock screen include: a terminal device 10 and a server 20. The terminal device 10 and the server 20 may be connected through a communication network. The communication network includes a wireless network and a wired network, where the wireless network includes one or any combination of a wireless wide area network, a wireless local area network, a wireless metropolitan area network and a wireless personal area network. The network includes Network entities, such as routers and gateways, which are not shown in the figure. The terminal device 10 may perform information interaction with the server 20 through the communication network, for example, may download an application (such as an e-commerce application) from the server 20.

The server 20 may be configured to: acquire interactive information generated by a user performing a predetermined operation; dynamically update the generated interactive information into a pre-built interactive information database; invoke, when receiving a lock screen unlocking request, first interactive information in the database according to a first predetermined manner; generate an unlocking label according to the first interactive information invoked by the first predetermined manner, where the unlocking label is a label that realizes unlocking of a lock screen after being triggered by the user; generate multiple interference labels that are different from the unlocking label according to the unlocking label, where the interference labels are labels that can not realize the unlocking of the lock screen after being triggered by the user; transmit the unlocking label and the multiple interference labels to a terminal device for display; and receive a user operation of triggering the unlocking label to unlock the lock screen.

The terminal device 10 may be configured to: generate a lock screen unlocking request according to a user operation on an application on the terminal device, and transmit the lock screen unlocking request to a server; receive an unlocking label and multiple interference labels from the server, and display the unlocking label and the multiple interference labels on a lock screen interface; detect a user operation of triggering the unlocking label and notify the server of the operation; and receive an unlocking instruction from the server to unlock the lock screen.

Figure 1B:
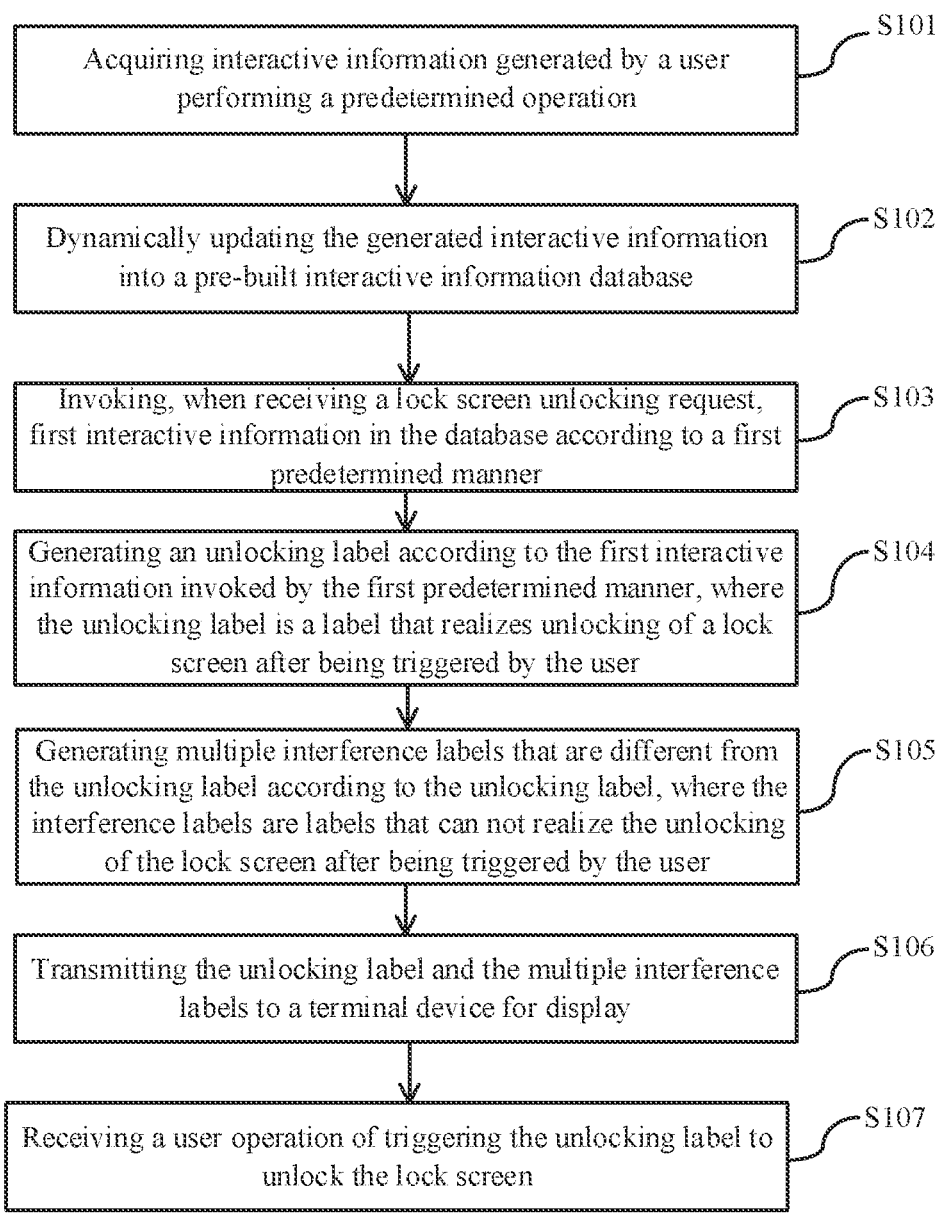
FIG. 1B is a schematic flowchart of the method for unlocking a lock screen according to some embodiments of the present disclosure.

FIG. 1B is a schematic flowchart of the method for unlocking a lock screen according to some embodiments. As shown in FIG. 1B, in some embodiments, the method for unlocking a lock screen includes steps S101 to S107.

S101 includes acquiring interactive information generated by a user performing a predetermined operation.

In this step, the predetermined operation may be a pre-set user operation. The user operation is, for example, an operation on a web page of an application after the user logs in to the application through a terminal device. The terminal device may be a mobile phone, a tablet computer, a notebook computer, a desktop computer or the like. For example, in a scenario where the application is an e-commerce application, the predetermined operation may be one or more types of predetermined operations, and a user shopping operation and/or a user operation of searching for a commodity in the e-commerce application may be used as the predetermined operation. The predetermined operation mentioned in this step is a user operation that may generate the interactive information between the user and a service provided by the application, and an operation that can not generate the interactive information can not be used as the predetermined operation. The shopping operation may generate interactive information, such as a picture, a price, and a delivery address of a purchased commodity, and the operation of searching for a commodity may also generate interactive information, such as a picture and a price of a searched commodity. Therefore, the shopping operation and the operation of searching for a commodity are both user operations that may generate interactive information.

In addition, the predetermined operation may be an operation with a certain frequency. For example, the shopping operation on the e-commerce application exemplified above is an operation repeatedly used by the user. It should also be noted that the predetermined operations may be different types of operations. For example, the shopping operation and the operation of searching for a commodity may both be set as the predetermined operations. Then, either the shopping operation or the operation of searching for a commodity, performed by the user, may be used to generate interactive information. Finally, it should be noted that the example of the e-commerce application in this step is merely for better explanation, and is not a specific limitation to this step.

This step may be performed by the server corresponding to the application on the terminal device to acquire the interactive information generated by the user performing the predetermined operation on the application.

S102 includes dynamically updating the generated interactive information into a pre-built interactive information database.

This step may form a constantly and dynamically updated interactive information database by storing the interactive information generated every time the user performs the predetermined operation.

S103 includes invoking, when receiving a lock screen unlocking request, first interactive information in the database according to a first predetermined manner.

In this step, when the server detects the lock screen unlocking request, the server invokes, in the first predetermined manner, the first interactive information in the database according to the user information of the user. The invoking, in the first predetermined manner, the first interactive information in the database may alternatively be invoking the first interactive information generated by predetermined user operations of one or more preset operation types, in the database. The lock screen unlock request, for example, is generated when an application, which is not used by the user for more than a predetermined period after logging in to the application but is not exited, is started again. The application detects a user start operation for the application through the terminal, generates the lock screen unlocking request, and then transmits the lock screen unlocking request to the server. The predetermined manner is not specifically limited in this step. In order to better explain this step, also taking the e-commerce application as an example, the first predetermined manner may be defined as invoking the interactive information, such as the picture, the price, and the delivery address of the commodity purchased by the user in the e-commerce application. As can be seen from the above example, the picture, the price and the delivery address correspond to data types of picture, number and character respectively. In other words, the first interactive information invoked by the first predetermined manner may contain different data types, and the first predetermined manner may alternatively be defined as invoking the interactive information generated by the user searching for a commodity in the e-commerce application, or may even defined as invoking both the interactive information generated by the shopping operation and the interactive information generated by the operation of searching for a commodity.

S104 includes generating an unlocking label according to the first interactive information invoked by the first predetermined manner, where the unlocking label is a label that realizes unlocking of a lock screen after being triggered by the user.

After invoking the first interactive information of the user according to the first predetermined manner, the server converts the invoked first interactive information into the unlocking label. Taking the shopping operation on the e-commerce application as an example, the picture, the price, the delivery address and the like of the commodity at the time of purchasing the commodity may be used as parts of the unlocking label and expressed in the forms of an image, a number and a character. The function of the unlocking label is unlocking the screen after the unlocking label is triggered by s user selection. The unlocking label may be in the form of a picture. When generating the unlocking label, the server may generate an identifier of the unlocking label at the same time, for identifying the unlocking label.

S105 includes generating multiple interference labels that are different from the unlocking label according to the unlocking label, where the interference labels are labels that can not realize the unlocking of the lock screen after being triggered by the user.

In this step, the interference labels that are different from the unlocking label are generated according to the unlocking label generated in the previous step, and the interference labels are labels which, after being trigged by the selection, can not unlock the screen. The interference labels may be in the forms of pictures. When generating the interference labels, the server may generate identifiers of the interference labels at the same time, for identifying the interference labels. Alternatively, the server may not generate or store the identifiers of the interference labels, and when a label is triggered, the server may determine that the label is an interference label if the server does not find an identifier.

S106 includes transmitting the unlocking label and the multiple interference labels to a terminal device for display.

In this step, for example, the server may transmit the unlocking label and the multiple interference labels to an application on the terminal device for display by the application in its lock screen interface. While transmitting the unlocking label and the interference labels to the terminal device, the server also transmits their identifiers to the terminal device. If the user triggers the unlocking label, the unlocking succeeds; and if the user triggers the interference labels, the unlocking fails.

S107 includes receiving a user operation of triggering the unlocking label to unlock the lock screen.

After the user triggers the unlocking label of the application on the lock screen interface, the application may notify the server of the trigger operation through the terminal device. When the terminal notifies the server of the trigger operation, the terminal may also notify the server of the identifier of the unlocking label. In this step, after the server receives the trigger operation of the user, if it is determined that the user triggers the unlocking label, the server transmits a message indicating that the unlocking of the lock screen succeeds to the application on the terminal device to unlock the lock screen, so that the user may log in to the application. On the contrary, if the user triggers the interference labels, the unlocking of the lock screen of the application is not performed, and the unlocking fails.

In some embodiments of the present disclosure, the server may first acquire the interactive information generated every time the user performs the predetermined operation, and the interactive information may be constantly updated and changed interactive information. The database built by using the constantly changed interactive information is also a constantly updated dynamic interactive information database. The interactive information stored in the database may be the interactive information generated last time the user performs the predetermined operation on the application, or may be the interactive information stored every time the user performs the predetermined operation on the application. Because the interactive information in the database is constantly updated, even if a given predetermined manner is used to invoke the interactive information to generate the unlocking label every time the screen is locked, the unlocking label is dynamically changed due to the constant change of the user transaction information in the database. Even if the current unlocking label of the user is stolen, the next change of the next unlocking label cannot be known, so that the lock screen cannot be unlocked, thereby greatly improving the security of the lock screen.

In some embodiments, the first predetermined manner is defined as invoking interactive information generated last time the user performs the predetermined operation in the database.

In order to make the user not easy to forget the dynamic interactive information when in use, the interactive information obtained last time the user performs the predetermined operation may be invoked preferentially when the interactive information is invoked. The reason for generating the unlocking label according to the predetermined operation last time performed by the user is that the interactive information is the deepest memory of the user, which is convenient for the user to remember and improves the unlocking efficiency of the user.

Figure 1C:
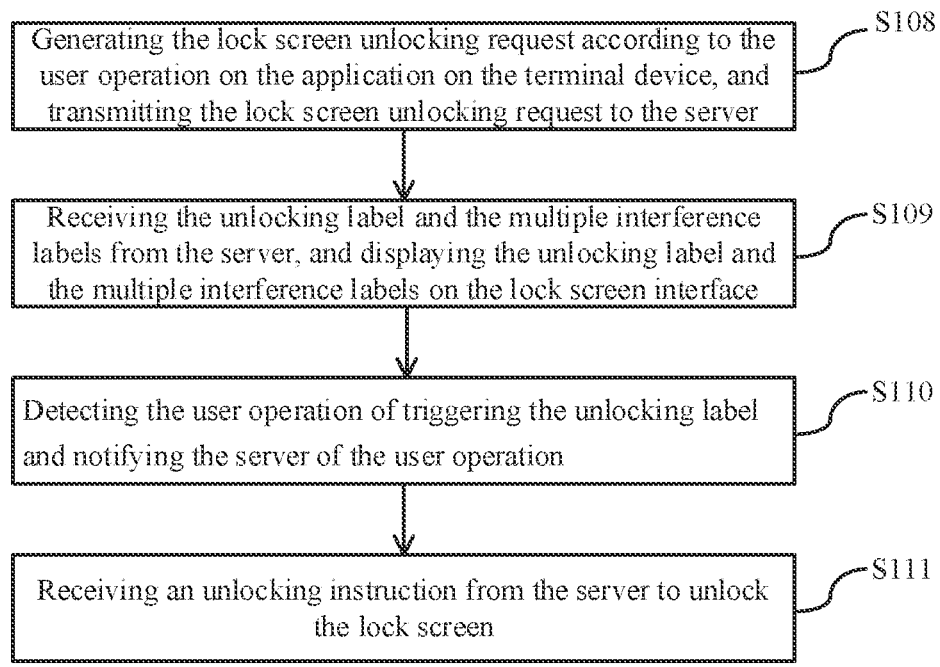
FIG. 1C is a schematic flowchart of another method for unlocking a lock screen according to some embodiments of the present disclosure.

Correspondingly, as shown in FIG. 1C, the terminal device on which the application is installed may perform the following operations:

Step S108 includes generating the lock screen unlocking request according to the user operation on the application on the terminal device, and transmitting the lock screen unlocking request to the server.

The lock screen unlocking request may be generated when the application detects through the terminal that the user does not use an application for more than a predetermined period, but does not exit the application and then starts the application again.

Step S109 includes receiving the unlocking label and the multiple interference labels from the server, and displaying the unlocking label and the multiple interference labels on the lock screen interface.

Step S110 includes detecting the user operation of triggering the unlocking label and notifying the server of the user operation.

Step S111 includes receiving an unlocking instruction from the server to unlock the lock screen.

If the terminal device receives the unlocking instruction from the server, the terminal device unlocks the lock screen of the application, that is, the user may log in to the application.

Figure 2:
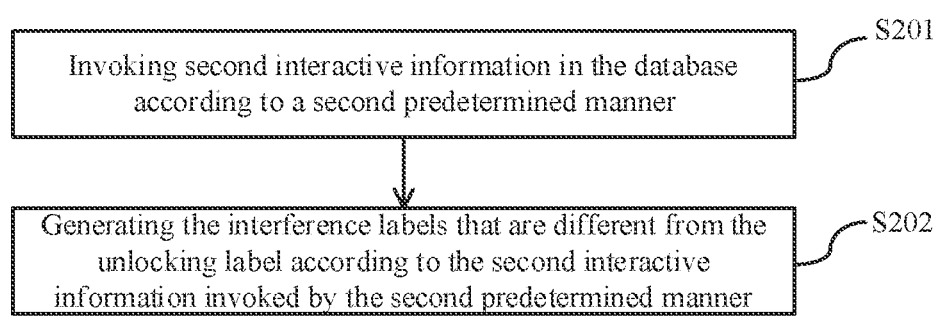
FIG. 2 is a schematic diagram of a further description of the method for unlocking a lock screen of FIG. 1B according to some embodiments of the present disclosure.

FIG. 2 is a schematic flowchart of the method for unlocking a lock screen according to some other embodiments. As shown in FIG. 2, in some embodiments, the step of generating the interference labels that are different from the unlocking label according to the unlocking label in the step S105, includes steps S201 and S202.

S201 includes invoking second interactive information in the database according to a second predetermined manner.

In this step, the second interactive information of the user in the database may be invoked according to another predetermined manner, i.e., the second predetermined manner. Taking the purchase of a commodity as an example, the first predetermined manner is invoking the purchase information obtained by the last predetermined operation in the predetermined operations, and then the second predetermined manner is invoking the interactive information obtained by the second-to-last predetermined purchase operation, or the interactive information of searching for a commodity.

The second interactive information invoked by the second predetermined manner, and the first interactive information may be generated by performing a given type of a predetermined operation, such as a shopping operation; or may be generated by performing different types of predetermined operations. For example, the first interactive information is generated by performing a shopping operation, and the second interactive information is generated according to a user operation of searching for a commodity or clicking on a commodity.

S202 includes generating the interference labels that are different from the unlocking label according to the second interactive information invoked by the second predetermined manner.

This step may include randomly swapping information pieces belonging to a given class, between the composition information pieces of the first interactive information and the composition information pieces of the second interactive information, to generate the interference labels.

In this step, different interactive information is invoked in a given database according to different predetermined manners, and strong interference labels may be generated according to the interactive information in the database, so as to prevent people who have a certain understanding of the user from selecting the correct unlocking label with high probability. For example, the user purchases a pair of travel shoes in an e-commerce application, and people other than the user know information about the travel shoes of the user, and then they may realize the unlocking by directly selecting the unlocking label corresponding to the travel shoes. However, if the second interactive information is invoked in the given database, and the second interactive information invoked in the database is other travel shoes purchased by the user or the interactive information obtained when the user searches for the travel shoes, and the composition information pieces of the first interactive information and the composition information pieces of the second interactive information are randomly combined, great confusion is caused, and the security of the lock screen is further improved.

The randomly swapping the information pieces belonging to the given class between the composition information pieces of the first interactive information and the composition information pieces of the second interactive information to generate the interference labels, may be randomly combining composition information pieces such as pictures, numbers and texts between the first interactive information and the second interactive information. For example, a picture, a price and a delivery address of a commodity purchased by the user last time in the first interactive information may be randomly combined with a picture, a price and a delivery address of a commodity purchased by a user before last time in the second interactive information to generate the interference labels. The interference labels may include the picture of the commodity purchased last time, the price of the commodity purchased before last time and the delivery address of the commodity purchased last time. The interference labels generated in this way are relatively close to the unlocking label, and have strong interference.

In some embodiments, the different interactive information is invoked from the given database according to the different predetermined manners, and the interference labels with strong interference may be generated by the above method, thereby greatly reducing the probability that someone other than the user selects the unlocking label. In addition, if two invoked interactive information pieces are the same, the two invoked interactive information pieces need to be further processed to make a difference between the two, and a specific processing method is not described herein.

Figure 3:
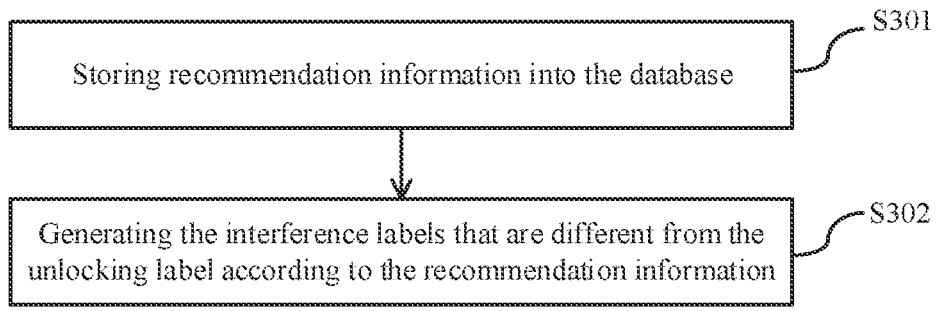
FIG. 3 is a schematic diagram of another further description of the method for unlocking a lock screen of FIG. 1B according to some embodiments of the present disclosure.

FIG. 3 is schematic diagram of the method for unlocking a lock screen according to some other embodiments. As shown in FIG. 3, in an embodiment, the step of generating the interference labels that are different from the unlocking label according to the unlocking label in the step S105, includes steps S301 and S302.

S301 includes storing recommendation information into the database.

When the user uses an application, the server may recommend personalized content related to the user operation to the user according to the user operation on the application. Alternatively, the server may recommend recently best-selling commodities to the user. Each of the recommended personalized content and commodity information may constitute the recommendation information.

In this step, the server may alternatively store the recommendation information into the database. For example, the user performs a predetermined shopping operation, and the server generates commodity information related to the commodity purchased by the user, and stores the commodity information into the database.

S302 includes generating the interference labels that are different from the unlocking label according to the recommendation information.

In this step, the interference labels that are different from the unlocking label are correspondingly generated according to the recommendation information, and are used for the lock screen. For example, the recommendation information may include a picture, a price, a name or another information data type of the recommended commodity. When generating the interference labels through the recommendation information, the data type of the interference labels may be selected as the same as that of the unlocking label, for example, the data types both are pictures, texts, numbers or the like, thereby improving the similarity between the unlocking label and interference labels, and further improving the security of the lock screen.

In some embodiments, the interference labels are generated according to the recommendation information and presented to the user on the lock screen interface, which actually completes the recommendation function once. This is because most users need to browse all the labels to select the unlocking label when they select the unlocking label to unlock. Therefore, the user also browses the recommendation information in the above process.

In some embodiments, after the step of displaying the unlocking label and the interference labels, the method further includes:

jumping to another lock screen unlocking mode, when the number of times that the user triggers the interference labels reaches a predetermined number.

In some embodiments, if the user selects the interference labels multiple times, in order for the user to perform the unlocking operation of the lock screen, other lock screen modes are provided. When multiple wrong selections of the user trigger the interference labels, the terminal device may jump to another unlocking mode.

In some embodiments of the present disclosure, since the unlocking label is in a dynamically updated state, in order to prevent the user from forgetting the interactive information corresponding to the unlocking label, the user may implement the unlocking operation after a wrong selection through the method of some embodiments. In addition, when the lock screen unlocking method of the present disclosure is used for the first time, since the acquired interactive information has not been stored in the database, the terminal device may need to directly jump to another lock screen unlocking mode or perform an initialization setting on the lock screen of the present disclosure, and details are not described herein.

The previous embodiments are used to unlock the lock screen of an application on a terminal device, and may alternatively be used to unlock the lock screen for logging in to a website.

The method for unlocking the lock screen of an e-commerce application is further described as follows, and it should be noted that the e-commerce application is merely an example for better explanation of the present application, and is not a specific limitation to the method of the present disclosure.

A server corresponding to the e-commerce application on the terminal device acquires interactive information generated every time a user performs a predetermined operation on the e-commerce application. For example, the server may perform a predetermined setting for a shopping operation of the user, define each shopping operation of the user as the predetermined operation, and define information such as a picture, a price, a delivery address of a commodity generated every time the user performs the predetermined operation as the interactive information in this step.

The server dynamically updates the generated interactive information into a pre-built interactive information database. It should be noted that if the user logs in to the application on the terminal device for the first time, the database may not store any data at this time, and the terminal device may jump to another lock screen unlocking mode or perform an initialization setting. The specific initialization setting includes setting an initial password and the like, and details are not described herein.

When detecting a lock screen unlocking request, the terminal device transmits the lock screen unlocking request to the server, and after the server receives the lock screen unlocking request, the server invokes first interactive information in the database according to a first predetermined manner. When the terminal device detects a user operation of triggering unlocking of a lock screen, the terminal device generates a lock screen unlocking request according to the operation of triggering unlocking of the lock screen and transmits the lock screen unlocking request to the server, and then the server invokes interactive information in the database according to a predetermined manner to generate an unlocking label. Specifically, when the user logs in to the application, the lock screen unlocking request is triggered, and the information, such as the picture, the price and the delivery address of the commodity in the database, is invoked.

The server generates the unlocking label according to the first interactive information invoked by the first predetermined manner, where the unlocking label is a label that realizes unlocking after being triggered by the user. The unlocking label is generated according to the information invoked by the first predetermined manner in the previous step, and the unlocking label may be the picture, the price or the delivery address of the commodity, or a combination thereof. In other words, the data type of the unlocking label may be a picture, a number, a text or the like. The first predetermined manner may be using the interactive information obtained the last time the user performs the predetermined operation, because the last predetermined operation performed by the user is an operation remembered relatively better. It should be noted that, for example, it is also feasible that the first predetermined manner uses the interactive information obtained the second-to-last time the user performs the predetermined operation, but compared to the interactive information obtained the last time the user performs the predetermined operation, the possibility of the user forgetting the interactive information obtained the second-to-last time the user performs the predetermined operation is relatively greater. Moreover, the newer the predetermined operation is, the smaller the risk of the user forgetting the interactive information is, so that the security may be further ensured from the other side. In summary, it can be seen that invoking the last predetermined operation performed by the user is a preferred embodiment.

The server generates multiple interference labels that are different from the unlocking label according to the unlocking label, where the interference labels are labels that can not realize the unlocking of the lock screen after being triggered by the user.

In principle, a label that is different from the unlocking label may be an interference label, and the interference label may be one or more, and may even use a different data type. For example, the data type of the unlocking label is a picture and the data type of the interference label is a number. It should be noted that in order to generate the interference label with strong interference to improve the security of the lock screen, a second predetermined manner is used to invoke interactive information in the database. The first predetermined manner and the second predetermined manner are two different invoking manners, but both are used to invoke interactive information in the database. Specifically, the second predetermined manner may be, for example, invoking an early shopping predetermined operation, or merely invoking an early search commodity information, so that since the shopping operation and the search both are operations performed by the user in the database, the both have strong interference and may further improve the security of the lock screen. In addition, recommendation information may be alternatively received into the database, and then an interference label may be generated according to the recommendation information in the database. Since the user needs to browse the interference label while browsing the unlocking label when unlocking, the recommendation function of the information may be realized. If the recommended commodity is related to the purchased commodity or search commodity of the user predetermined operation, the inference of the inference label generated by the recommendation information may be greatly improved, thereby improving the security of the lock screen.

The server transmits the unlocking label and the multiple interference labels to the terminal device for display by the terminal device.

After the terminal device displays the unlocking label and the interference labels, the unlocking succeeds when the selection of the user triggers the unlocking label, and the unlocking fails when the selection of the user triggers the interference labels. Specifically, the unlocking label and the interference labels may be arranged in a matrix of 3 rows and 3 columns or 5 rows and 5 columns, and the labels are randomly arranged. In addition, a mixed method in which the data types are different may alternatively be used, that is, the unlocking label and the interference labels may include picture labels, number labels, text labels and labels of other data types.

Finally, the terminal device detects the user operation of triggering the unlocking label and notifies the server of the user operation. After determining that the operation of triggering the unlocking label satisfies an unlocking condition, the server transmits an unlocking instruction to the shopping application on the terminal device, and the terminal device performs the unlocking of the lock screen.

Figure 4:
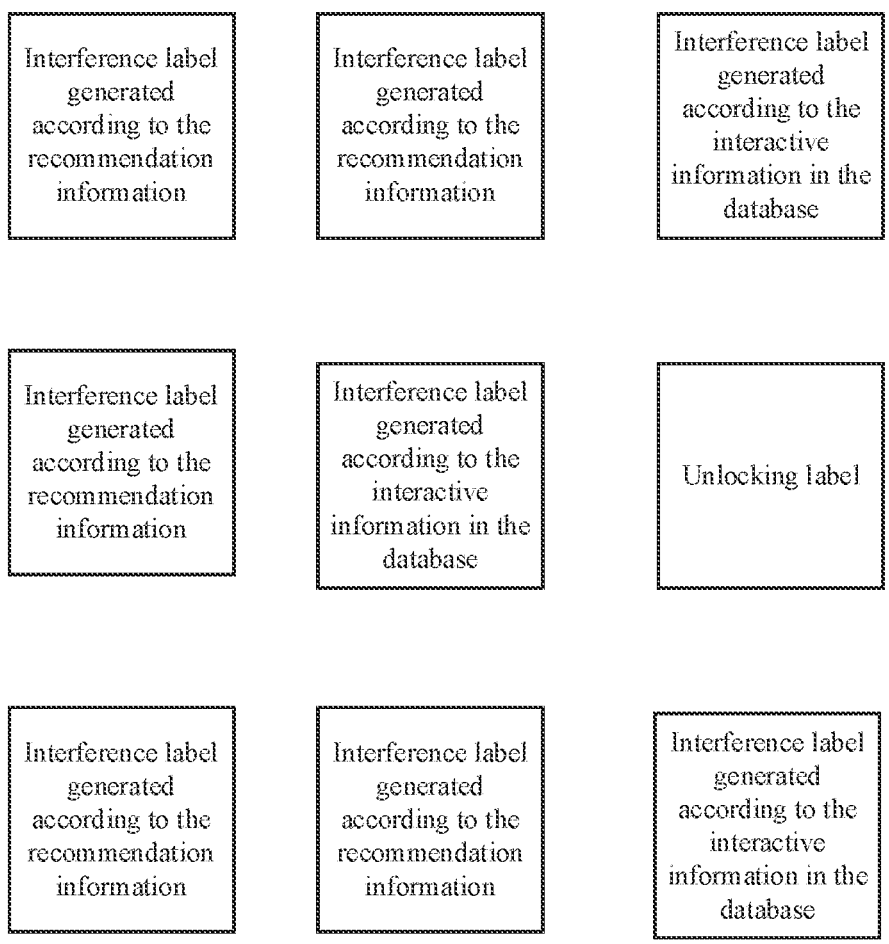
FIG. 4 is a schematic diagram of a display result of the method for unlocking a lock screen according to some embodiments of the present disclosure.

In order to better reflect the unlocking interface of the lock screen generated in the above steps, FIG. 4 is a schematic diagram of a display result of the method for unlocking a lock screen according to some embodiments. As shown in FIG. 4, the figure shows a lock screen interface with labels arranged in a matrix of 3 rows and 3 columns, where the rightmost label in the second row is the unlocking label. The interface includes the interference labels generated according to the invoked interactive information in the database, and such interference labels are also generated according to the interactive information of the user in the database, so that the interference labels have strong interference. The interface also includes the interference labels that are generated according to the recommendation information. It can be seen from the figure that each kind of the interference labels may include multiple labels, and the arrangement relationship among all labels is completely randomized.

When the number of times that the user selects the interference labels reaches a predetermined number, the terminal device jumps to another lock screen unlocking mode.

If the number of times that the user selects the interference labels reaches the predetermined number, the terminal device jumps to another lock screen unlocking mode. In this step, a method for unlocking a lock screen after the unlocking of the lock screen fails is provided. For example, if the user selects the unlocking label within the rated number of operations, the unlocking succeeds, and if the user does not select the unlocking label within the rated number of operations, the mobile terminal jumps to another lock screen unlocking mode.

Figure 5:
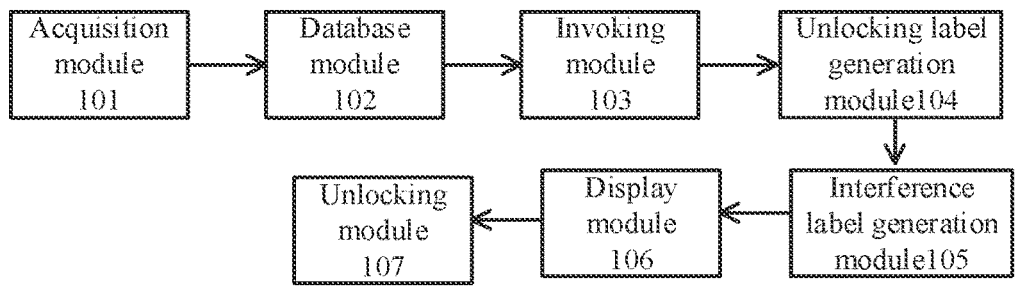
FIG. 5 is a schematic architecture diagram of an apparatus for unlocking a lock screen according to some embodiments of the present disclosure.

FIG. 5 is a schematic architecture diagram of an apparatus for unlocking a lock screen according to some embodiments. As shown in FIG. 5, in some embodiments, the apparatus for unlocking a lock screen is provided, and includes:

an acquisition module 101 configured to acquire interactive information generated by a user performing a predetermined operation;

a database module 102 configured to dynamically update the generated interactive information into a pre-built interactive information database;

an invoking module 103 configured to invoke, when receiving a lock screen unlocking request, first interactive information in the database according to a first predetermined manner;

an unlocking label generation module 104 configured to generate an unlocking label according to the first interactive information invoked by the first predetermined manner, where the unlocking label is a label that realizes unlocking of the lock screen after being triggered by the user;

an interference label generation module 105 configured to generate multiple interference labels that are different from the unlocking label according to the unlocking label, where the interference labels are labels that can not realize the unlocking of the lock screen after being triggered by the user;

a display module 106 configured to transmit the unlocking label and the multiple interference labels to a terminal device for display; and an unlocking module 107 configured to receive a user operation of triggering the unlocking label to unlock the lock screen.

The apparatus for unlocking a lock screen according to FIG. 5 may be arranged on the server.

Figure 6:
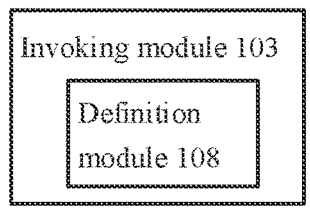
FIG. 6 is a schematic architecture diagram of the apparatus for unlocking a lock screen according to some embodiments of the present disclosure.

FIG. 6 is a schematic architecture diagram of the apparatus for unlocking a lock screen according to some embodiments. As shown in FIG. 6, in some embodiments, the invoking module 103 includes:

a definition module 108 configured to define the first predetermined manner as invoking interactive information generated last time the user performs the predetermined operation in the database.

Figure 7:
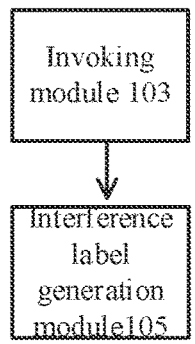
FIG. 7 is a schematic architecture diagram of the apparatus for unlocking a lock screen according to some embodiments of the present disclosure.

FIG. 7 is a schematic architecture diagram of the apparatus for unlocking a lock screen according to some other embodiments. As shown in FIG. 7, in some embodiments, the invoking module 103 is further configured to invoke second interactive information in the database according to a second predetermined manner; and the interference label generation module 105 is further configured to generate the interference labels that are different from the unlocking label according to the second interactive information invoked by the second predetermined manner.

Figure 8:
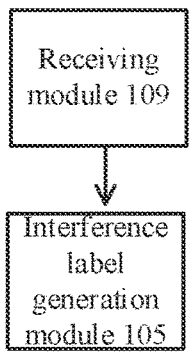
FIG. 8 is a schematic architecture diagram of the apparatus for unlocking a lock screen according to some embodiments of the present disclosure.

FIG. 8 is a schematic architecture diagram of the apparatus for unlocking a lock screen according to some other embodiments. As shown in FIG. 8, in some embodiments, the apparatus includes: a receiving module 109 configured to store recommendation information into the database; and the interference label generation module 105 configured to generate the interference labels that are different from the unlocking label according to the recommendation information.

Alternatively, in some embodiments, the apparatus includes: a jumping module configured to jump to another lock screen unlocking mode, when a number of times that the user triggers the interference labels reaches a predetermined number.

Figure 9:
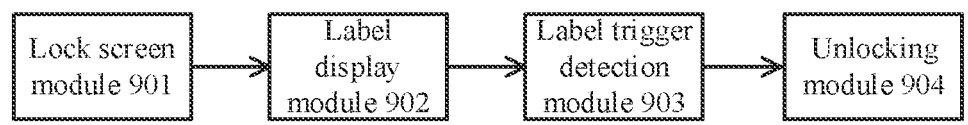
FIG. 9 is a schematic architecture diagram of an apparatus for unlocking a lock screen according to some embodiments of the present disclosure.

FIG. 9 is a architecture diagram of an apparatus for unlocking a lock screen according to some embodiments of the present disclosure. The apparatus for unlocking a lock screen may be provided on the terminal device, and may include:

a lock screen module 901 configured to generate a lock screen unlocking request according to a user operation on an application on a terminal device, and transmit the lock screen unlocking request to a server, where when the terminal device detects that the user clicks on an application icon on the terminal device and prepares to log in to the application, the lock screen unlocking request is generated, and the lock screen unlocking request is transmitted to the server;

a label display module 902 configured to receive an unlocking label and multiple interference labels from the server, and display the unlocking label and the multiple interference labels on a lock screen interface;

a label trigger detection module 903 configured to detect a user operation of triggering the unlocking label and notify the server of the user operation; and an unlocking module 904 configured to receive an unlocking instruction from the server to unlock the lock screen. The terminal device performs the unlocking of the lock screen of the application, if receiving the unlocking instruction from the server, that is, the user may log in to the application.

Figure 10:
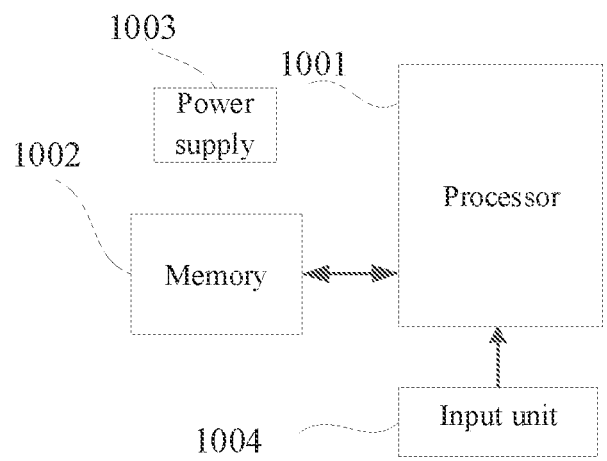
FIG. 10 is a schematic diagram of an internal structure of a computer device according to some embodiments of the present disclosure.

Some embodiments of the present disclosure may further provide a computer device, which may be the server or the terminal device according to some embodiments of the present disclosure. FIG. 10 shows a structure of a computer device provided by some embodiments of the present disclosure.

The computer device may include a processor 1001 with one or more processing cores, one or more memories 1002, a power supply 1003, an input unit 1004 and the like. The memory 1002 is a computer readable storage medium. The structure shown in FIG. 10 does not constitute a limitation to the server or the terminal device, and more or less components than shown may be included, or some components may be combined, or different component arrangements may be provided.

The processor 1001 is a control center of the computer device, connects various parts of the entire computer device by using various interfaces and lines, and performs various functions of the computer device and processes data by running or executing software programs and/or modules stored in the memory 1002 and invoking data stored in the memory 1002, thereby monitoring the computer device as a whole. Alternatively, the processor 1001 may include one or more processing cores; and the processor 1001 may integrate an application processor and a modem processor, where the application processor mainly processes an operating system, a user interface, an application program and the like, and the modem processor mainly processes wireless communication. It should be appreciated that the modem processor may alternatively not be integrated into the processor 1001.

The memory 1002 may be used to store the software programs and the modules, and the processor 1001 executes various functional applications and data processing by running the software programs and the modules stored in the memory 1002. The memory 1002 may mainly include a storage program area and a storage data area, where the storage program area may store an operating system, an application program (such as a sound play function, an image play function or the like) required by at least one function and the like; and the storage data area may store data or the like created according to the use of the computer device. In addition, the memory 1002 may include a high-speed random access memory, and may alternatively include a non-transitory memory, such as at least one magnetic disk storage device, a flash memory device or other non-transitory solid state storage devices. Accordingly, the memory 1002 may alternatively include a memory controller, so that the processor may access the memory 1002.

The computer device further includes the power supply 1003 for supplying power to the respective components. Preferably, the power supply 1003 may be logically connected to the processor 1001 through a power management system, so that functions such as charging, discharging and power consumption management are managed through the power management system. The power supply 1003 may alternatively include one or more DC or AC power supplies, a recharging system, a power failure detection circuit, a power converter or inverter, a power status indicator or any other component.

The computer device may alternatively include the input unit 1004, which may receive input digit or character information and generate a signal input of keyboard, mouse, joystick, optical or trackball, which is related to user settings and functional control.

Although not shown, the computer device may alternatively include a display unit or the like, and details are not described herein. Specifically, in some embodiments of the present disclosure, the processor 1001 in the computer loads the executable files corresponding to the processes of one or more application programs into the memory 1002 according to the following instructions, and the processor 1001 runs the application programs stored in the memory 1002, thereby implementing the method for unlocking a lock screen of the server or the terminal in the previous embodiments.

All or some of the steps in the various methods of the previous embodiments may be completed by a program instructing relevant hardware, and the program may be stored in a computer readable storage medium, which may include a read only memory (ROM), a random access memory (RAM), a magnetic disk, an optical disk or the like.

In some embodiments, the present disclosure further provides a computer readable storage medium storing a computer program, which, when executed by the processor, implements the method for unlocking a lock screen according to some embodiments of the present disclosure.

The above are merely preferred embodiments of the present disclosure, and are not intended to limit the present disclosure. Any modification, equivalent replacement, improvement and the like, which fall within the spirit and principles of the present disclosure, are intended to be included within the scope of the present disclosure.

What is claimed is:

1. A method for unlocking a lock screen, wherein the method comprises:
    acquiring interactive information generated by a user performing a predetermined operation;
    dynamically updating the generated interactive information into a pre-built interactive information database;
    invoking, in response to receiving a lock screen unlocking request, first interactive information in the database according to a first predetermined manner;
    generating an unlocking label according to the first interactive information invoked by the first predetermined manner, wherein the unlocking label is a label that realizes unlocking of the lock screen after being triggered by the user;
    generating a plurality of interference labels different from the unlocking label according to the unlocking label, wherein the interference labels are labels that can not realize the unlocking of the lock screen after being triggered by the user;
    transmitting the unlocking label and the plurality of the interference labels to a terminal device for display; and
    receiving a user operation of triggering the unlocking label to unlock the lock screen,
    wherein the method is performed by a processor;
    wherein the generating the plurality of the interference labels different from the unlocking label according to the unlocking label, comprises:
    storing recommendation information into the database; and
    generating the interference labels different from the unlocking label according to the recommendation information.

2. The method for unlocking a lock screen according to claim 1, wherein the first predetermined manner is defined as invoking interactive information generated last time the user performs the predetermined operation in the database.

3. The method for unlocking a lock screen according to claim 1, wherein the generating the plurality of interference labels different from the unlocking label according to the unlocking label, further comprises:
    invoking second interactive information in the database according to a second predetermined manner; and
    generating the interference labels different from the unlocking label according to the second interactive information invoked by the second predetermined manner.

4. The method for unlocking a lock screen according to claim 1, wherein the method further comprises:

displaying the unlocking label and the interference labels; and jumping to another lock screen unlocking mode, in response to determining that a number of times that the user triggers the interference labels reaches a predetermined number.

5. An apparatus for unlocking a lock screen, wherein the apparatus comprises:

at least one processor; and a memory in communication with the at least one processor, wherein the memory stores instructions executable by the at least one processor, and the instructions, when executed by the at least one processor, cause the at least one processor to perform operations comprising:

acquiring interactive information generated by a user performing a predetermined operation;

dynamically updating the generated interactive information into a pre-built interactive information database;

invoking, in response to receiving a lock screen unlocking request, first interactive information in the database according to a first predetermined manner;

generating an unlocking label according to the first interactive information invoked by the first predetermined manner, wherein the unlocking label is a label that realizes unlocking of the lock screen after being triggered by the user;

generating a plurality of interference labels different from the unlocking label according to the unlocking label, wherein the interference labels are labels that can not realize the unlocking of the lock screen after being triggered by the user;

transmitting the unlocking label and the plurality of the interference labels to a terminal device for display; and receiving a user operation of triggering the unlocking label to unlock the lock screen;

wherein the generating the plurality of the interference labels different from the unlocking label according to the unlocking label, comprises:

storing recommendation information into the database; and generating the interference labels different from the unlocking label according to the recommendation information.

6. The apparatus for unlocking a lock screen according to claim 5, wherein the first predetermined manner is defined as invoking interactive information generated last time the user performs the predetermined operation in the database.

7. The apparatus for unlocking a lock screen according to claim 5, wherein the generating the plurality of interference labels different from the unlocking label according to the unlocking label, further comprises: invoking second interactive information in the database according to a second predetermined manner; and generating the interference labels different from the unlocking label according to the second interactive information invoked by the second predetermined manner.

8. The apparatus for unlocking a lock screen according to claim 5, wherein the operations comprise:

displaying the unlocking label and the interference labels; and jumping to another lock screen unlocking mode, when a number of times that the user triggers the interference labels reaches a predetermined number.

9. A non-transitory computer readable storage medium storing a computer program, wherein the program, when executed by a processor, causes the processor to perform operations comprising:

acquiring interactive information generated by a user performing a predetermined operation;

dynamically updating the generated interactive information into a pre-built interactive information database;

invoking, in response to receiving a lock screen unlocking request, first interactive information in the database according to a first predetermined manner;

generating an unlocking label according to the first interactive information invoked by the first predetermined manner, wherein the unlocking label is a label that realizes unlocking of the lock screen after being triggered by the user;

generating a plurality of interference labels different from the unlocking label according to the unlocking label, wherein the interference labels are labels that can not realize the unlocking of the lock screen after being triggered by the user;

transmitting the unlocking label and the plurality of the interference labels to a terminal device for display; and receiving a user operation of triggering the unlocking label to unlock the lock screen;

wherein the generating the plurality of the interference labels different from the unlocking label according to the unlocking label, comprises:

storing recommendation information into the database; and generating the interference labels different from the unlocking label according to the recommendation information.

* * * * *